United States Patent
Kowalchuk et al.

(10) Patent No.: US 10,980,168 B2
(45) Date of Patent: Apr. 20, 2021

(54) SYSTEMS AND METHODS FOR MONITORING AN AGRICULTURAL METERING SYSTEM

(71) Applicant: CNH Industrial Canada, Ltd., Saskatoon (CA)

(72) Inventors: Trevor Lawrence Kowalchuk, Saskatoon (CA); Dennis George Thompson, Eagle Ridge (CA); Anthony Charles Rapley, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 154 days.

(21) Appl. No.: 16/162,180

(22) Filed: Oct. 16, 2018

(65) Prior Publication Data

US 2020/0113125 A1 Apr. 16, 2020

(51) Int. Cl.
*A01C 7/10* (2006.01)
*A01C 7/20* (2006.01)
*A01C 7/12* (2006.01)

(52) U.S. Cl.
CPC .............. *A01C 7/105* (2013.01); *A01C 7/124* (2013.01); *A01C 7/20* (2013.01)

(58) Field of Classification Search
CPC ........... A01C 7/105; A01C 7/102; A01C 7/10; A01C 7/08; A01C 7/00; A01C 7/124; A01C 7/123; A01C 7/12; A01C 7/20
See application file for complete search history.

(56) References Cited

U.S. PATENT DOCUMENTS

| | | | |
|---|---|---|---|
| 3,634,868 A | 1/1972 | Pelavin et al. | |
| 4,821,557 A | 4/1989 | Beeson, III | |
| 5,754,451 A | 5/1998 | Williams | |
| 6,522,982 B1 * | 2/2003 | Pastorello | G06J 1/00 |
| | | | 324/110 |
| 7,295,934 B2 | 11/2007 | Hairston | |
| 7,539,593 B2 | 5/2009 | Machacek | |
| 7,654,151 B2 | 2/2010 | Agar et al. | |
| 8,639,464 B2 | 1/2014 | Artiuch et al. | |
| 9,043,949 B2 | 6/2015 | Liu et al. | |
| 2007/0293977 A1 | 12/2007 | Galt et al. | |
| 2015/0051743 A1 | 2/2015 | Darnold | |
| 2016/0157413 A1 | 6/2016 | Kowalchuk et al. | |
| 2016/0169716 A1 | 6/2016 | Laflen et al. | |
| 2016/0313151 A1 | 10/2016 | Duke et al. | |
| 2018/0255699 A1 | 9/2018 | Cloutier Boily et al. | |

FOREIGN PATENT DOCUMENTS

CN 2743798 Y 11/2005

* cited by examiner

*Primary Examiner* — Christopher J. Novosad
(74) *Attorney, Agent, or Firm* — Rebecca L. Henkel; Rickard K. De Mille (57) ABSTRACT

A monitoring system for an agricultural metering system includes a processor configured to receive sensor data from one or more sensors positioned about the agricultural metering system. The processor is also configured to compare the sensor data to one or more thresholds to determine a condition of one or more drive units of the agricultural metering system. The processor is further configured to provide an output indicative of the condition of the one or more drive units of the agricultural metering system.

10 Claims, 5 Drawing Sheets

SYSTEMS AND METHODS FOR MONITORING AN AGRICULTURAL METERING SYSTEM

BACKGROUND

The present disclosure relates generally to systems and methods for monitoring an agricultural metering system.

Generally, seeding implements (e.g., seeders) are towed behind a tractor or other work vehicle via a mounting bracket secured to a rigid frame of the implement. Seeding implements typically include multiple row units distributed across a width of the implement. Each row unit is configured to deposit seeds at a target depth beneath the soil surface of a field, thereby establishing rows of planted seeds. For example, each row unit typically includes a ground engaging tool or opener that forms a seeding path (e.g., trench) in the soil. A seed tube (e.g., coupled to the opener) is configured to deposit seeds and/or other agricultural products (e.g., fertilizer) into the trench. The opener and the seed tube may be followed by closing discs that move displaced soil back into the trench and/or a packer wheel that packs the soil on top of the deposited seeds.

In certain configurations, an air cart is used to meter and deliver agricultural product (e.g., seeds, fertilizer) to the row units of the seeding implement. The air cart generally includes a storage tank (e.g., a pressurized tank), an air source (e.g., a blower), and a metering system. The product may be gravity fed from the storage tank to the metering system, which distributes a desired volume of product into an air flow generated by the air source. The air flow carries the product to the row units via conduits extending between the air cart and the seeding implement. The metering system may include meter rollers that regulate the flow of product based on meter roller geometry and rotation rate. It is now recognized that it may be desirable to monitor a condition of the metering system to facilitate repairs and/or maintenance operations.

SUMMARY

In one embodiment, a monitoring system for an agricultural metering system includes a processor configured to receive sensor data from one or more sensors positioned about the agricultural metering system. The processor is also configured to compare the sensor data to one or more thresholds to determine a condition of one or more drive units of the agricultural metering system. The processor is further configured to provide an output indicative of the condition of the one or more drive units of the agricultural metering system.

In one embodiment, an agricultural system includes an air cart, a metering system having a meter roller configured to dispense a material from a storage tank into an air flow within a conduit, an electric motor configured to drive rotation of the meter roller, and one or more sensors configured to obtain sensor data indicative of operational characteristics of the electric motor. The agricultural system also includes a processor configured to compare the sensor data to one or more thresholds to determine a condition of the electric motor.

In one embodiment, a method of monitoring an agricultural metering system includes receiving, at a processor, sensor data from one or more sensors positioned about a drive unit of the agricultural metering system. The method also includes comparing, via the processor, the sensor data to one or more thresholds to determine a condition of the drive unit of the agricultural metering system. The method further includes instructing, via the processor, a user interface to provide an output indicative of the condition of the drive unit of the agricultural metering system.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

The present embodiments are generally directed to systems and methods for monitoring components of an agricultural metering system, such as a metering system used in an air cart. In some embodiments, a monitoring system may include or work in conjunction with one or more sensors positioned about the metering system and/or at various other locations of the air cart. The one or more sensors may monitor respective parameters (e.g., temperature, current, voltage, torque) and generate respective sensor data. In certain embodiments, the monitoring system may include one or more controllers (e.g., electronic controller or other computing device) configured to analyze the sensor data, compare the sensor data to baseline data, and determine a condition of components of the metering system based on the comparison. By determining the condition of the metering system, the disclosed embodiments may facilitate scheduling maintenance operations, extend the life of components of the metering system, reduce downtime, and/or reduce operating costs, for example. Certain embodiments described herein relate to monitoring an electric drive (e.g., an electric motor) of the metering system; however, it should be understood that the systems and methods may be adapted to monitor other types of drives (e.g., a hydraulic drive, a pneumatic drive) that are used to drive the metering system or other components of the air cart (e.g., a blower of the air cart and/or a fill system associated with the air cart) or that are used to drive other components of other agricultural implements.

Figure 1:
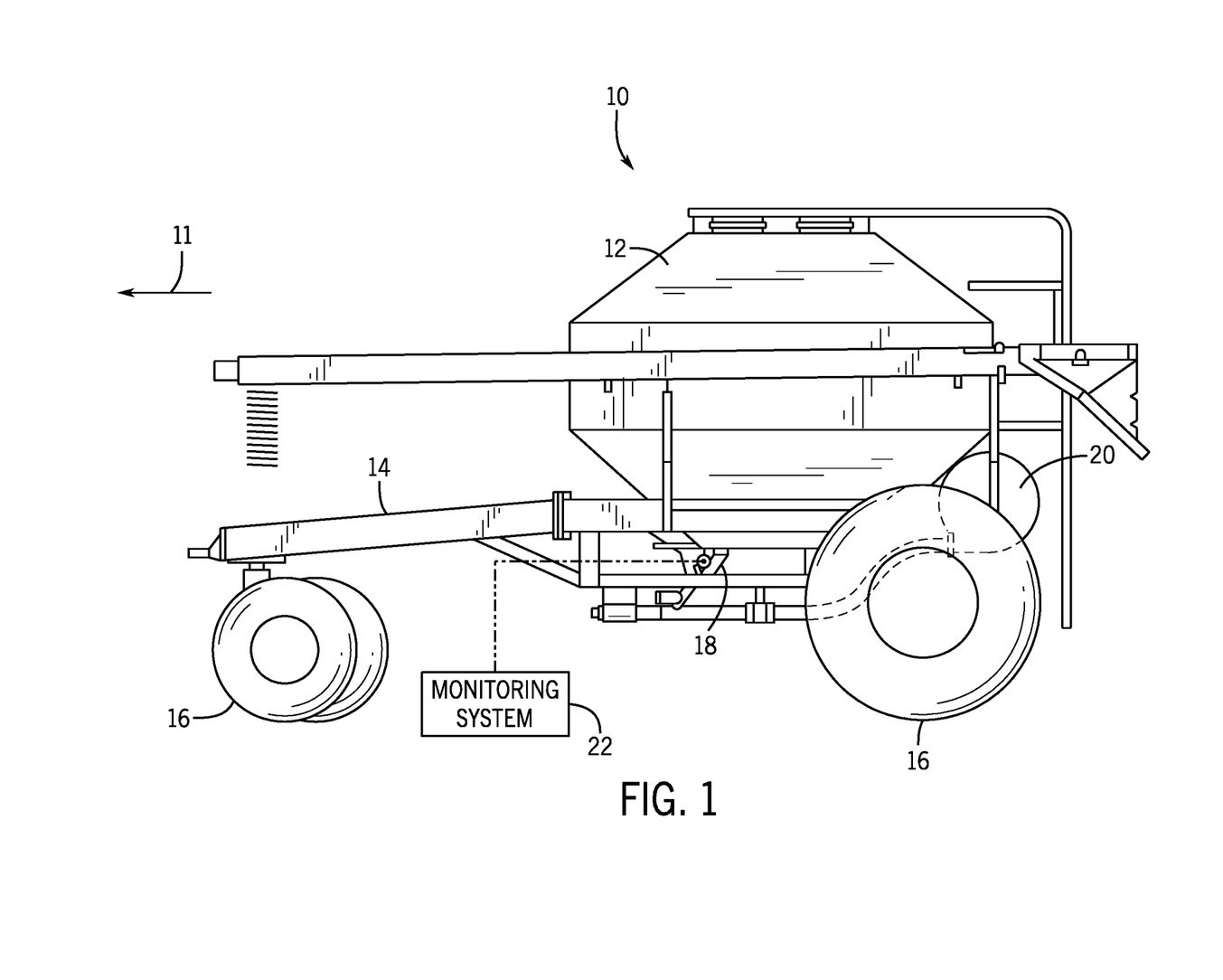
FIG. 1 is a side view of an embodiment of an air cart having a metering system configured to regulate a flow of particulate material and a monitoring system configured to monitor a condition of the metering system.

Turning now to the drawings, FIG. 1 is a side view of an air cart 10 that may be used in conjunction with a towable agricultural implement to deposit seeds into soil. For example, certain agricultural implements include row units configured to open the soil, dispense seeds into the opening in the soil, and re-close the opening in the soil. Such agricultural implements are generally coupled to a tow vehicle, such as a tractor, and pulled through a field. In certain configurations, seeds are conveyed to the row units by the air cart 10 (e.g., seeds are dispensed into an air flow in conduits that extend to the row units), which is generally towed in sequence with the implement along a direction of travel 11 (e.g., behind the agricultural implement or in front of the agricultural implement). In certain configurations, the air cart 10 may be configured to provide fertilizer, or a combination of seeds and fertilizer, to the row units.

In the illustrated embodiment, the air cart 10 includes a storage tank 12, a frame 14, wheels 16, a metering system 18, and an air source 20. In certain configurations, the storage tank 12 includes multiple compartments for storing various flowable particulate materials. For example, one compartment may include seeds, such as canola or wheat, and another compartment may include a dry fertilizer. In such configurations, the air cart 10 is configured to deliver both the seeds and fertilizer to the agricultural implement. The frame 14 includes a towing hitch configured to couple to the agricultural implement or tow vehicle. As discussed in detail below, seeds and/or fertilizer within the storage tank 12 are gravity fed into the metering system 18. The metering system 18 includes one or more meter rollers that regulate the flow of material from the storage tank 12 into an air flow provided by the air source 20. The air flow then carries the material to the agricultural implement by pneumatic conduits. In this manner, the row units receive a supply of seeds and/or fertilizer for deposition within the soil. As discussed in more detail below, the air cart 10 may include or be used in conjunction with a monitoring system 22 that is configured to monitor a condition of the metering system 18.

Figure 2:
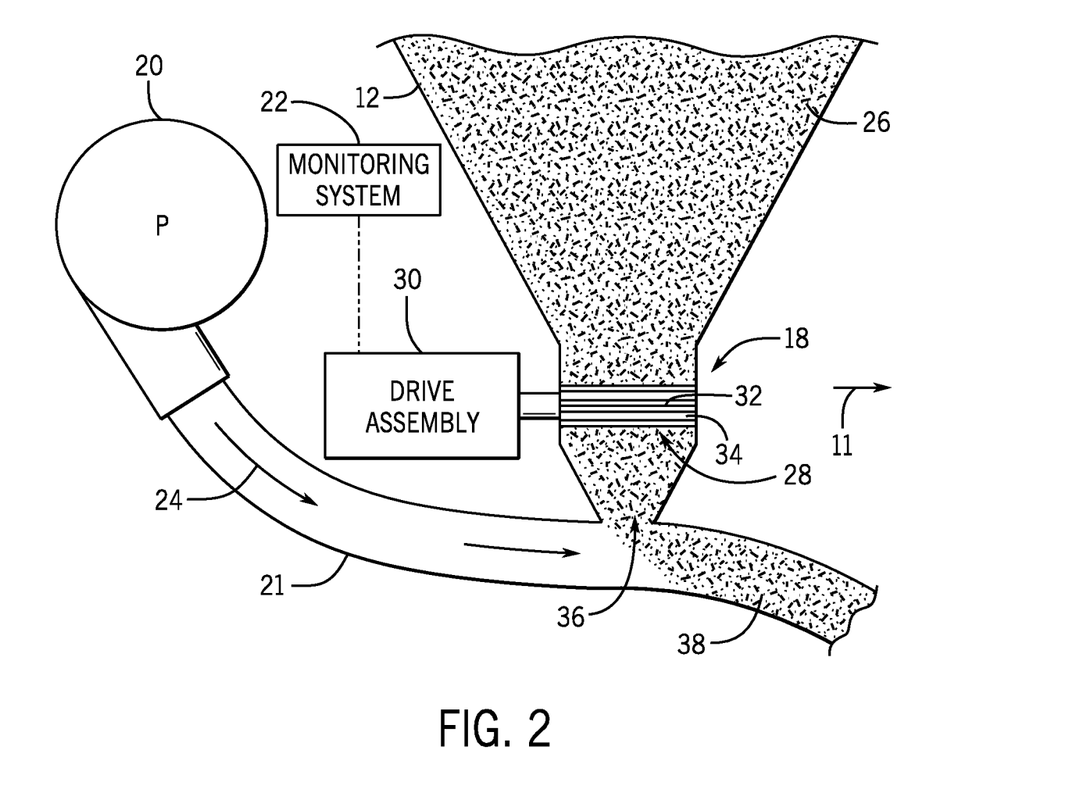
FIG. 2 is a schematic view of an embodiment of a portion of the air cart of FIG. 1.

FIG. 2 is a schematic view of the metering system 18 that may be used in the air cart 10 of FIG. 1. As illustrated, the air source 20 is coupled to a conduit 21 configured to flow air 24 past the metering system 18. The air source 20 may be a pump or blower powered by an electric or a hydraulic motor, for example. Flowable particulate material 26 (e.g., seeds, fertilizer) within the storage tank 12 flows by gravity into the metering system 18. In certain embodiments, the storage tank 12 is pressurized, such that a static pressure in the tank 12 is equal to or greater than a static pressure in the conduit 21, thereby facilitating an even flow of material through the metering system 18. The metering system 18 includes one or more meter rollers 28 configured to regulate the flow of material 26 into the air flow 24. In certain embodiments, the metering system 18 may include multiple meter rollers 28 (e.g., housed within individual meter boxes) disposed adjacent to one another in one or more rows extending laterally across the air cart 10 (FIG. 1). In addition, certain metering systems 18 may include twelve meter rollers 28, each housed within an individual meter box and each configured to flow particulate material into a respective conduit 21 (e.g., of a material distribution system) for distribution to one or more respective row units of the agricultural implement. However, in alternative embodiments, the metering system 18 may include more or fewer meter rollers (e.g., 1, 2, 3, 4, 5, 6, 7, 8, 9, 10, 11, 13, or more). By independently adjusting the rotational speed of each meter roller 28, product flow to different portions of the implement may be particularly controlled.

In the illustrated embodiment, the meter roller 28 is coupled to a drive assembly 30 configured to drive the meter roller 28 to rotate. In certain embodiments, the drive assembly 30 includes at least one drive unit, such as an electric or a hydraulic motor, configured to drive one or more meter rollers 28 to rotate. For example, in certain embodiments, multiple drive units may be coupled to respective meter rollers 28 to facilitate independent control of the rotation rates of the meter rollers 28. In certain embodiments, each meter roller 28 may be driven independently (e.g., independent of the other meter rollers 28) by a dedicated drive unit.

The meter roller 28 may include protrusions, such as the illustrated flutes 32, and recesses 34. Each respective recess 34 is disposed between a respective pair of flutes 32. As the meter roller 28 rotates, the respective pair of flutes 32 moves the material 26 disposed within the respective recess 34 downwardly, thereby transferring the material 26 to the conduit 21. The number and geometry of the flutes 32 are particularly configured to accommodate the material 26 being distributed. Certain meter rollers 28 may include six flutes 32 and a corresponding number of recesses 34. Alternative meter rollers may include more or fewer flutes 32 and/or recesses 34. For example, the meter roller 28 may include 1, 2, 3, 4, 5, 6, 7, 8, 9, 10, 11, 12, 13, 14, 15, 16, 17, 18, 19, 20, or more flutes 32 and/or recesses 34. In addition, the depth of the recesses 34 and/or the height of the flutes 32 are configured to accommodate the material 26 within the storage tank 12. For example, a meter roller 28 having deeper recesses 34 and fewer flutes 32 may be employed for larger seeds, while a meter roller 28 having shallower recesses 34 and more flutes 32 may be employed for smaller seeds. Other parameters such as flute pitch (i.e., angle of the flute relative to a longitudinal/rotational axis) and flute angle (i.e., angle of the flute relative to a radial axis) may also be particularly selected to accommodate the material 26. While the illustrated meter roller 28 includes flutes, it should be appreciated that in alternative embodiments, the meter roller 28 may include other protrusions, and/or the recesses may be omitted.

In the illustrated embodiment, the rotational axis of the meter roller 28 is oriented substantially parallel to the direction of travel 11 of the air cart 10. As used herein, substantially parallel may refer to an angle of about 0 to about 45 degrees, about 0 to about 30 degrees, about 0 to about 15 degrees, about 0 to about 5 degrees, or about 0 to about 1 degree relative to an axis/direction (e.g., the direction of travel 11). By way of example, substantially parallel may refer to an angle less than 5 degrees, less than 4 degrees, less than 3 degrees, less than 2 degrees, less than 1 degree, or less than 0.5 degrees relative to an axis/direction. In further embodiments, the meter roller 28 may be oriented substantially perpendicular to the direction of travel, or at any other suitable angle.

The rotation rate of the meter roller 28 controls the flow of material 26 into the air flow 24. For example, as the meter roller 28 rotates, the meter roller 28 transfers material through an opening 36 in the metering system 18 into a respective conduit 21 (e.g., into a conduit associated with a respective row unit or group of row units). The material then mixes with air from the air source 20, thereby forming an air/material mixture 38. The mixture 38 then flows to the respective row unit(s) of the implement via pneumatic conduit(s), where the seeds and/or fertilizer are deposited within the soil.

For operation, an operator may input a target application rate (e.g., pounds of material per acre, kilograms of material per square meter) for the air cart 10. The drive assembly 30 may be controlled (e.g., via an electronic controller) to drive the meter rollers 28 to rotate at a rotational rate that provides the target application rate as the air cart 10 travels through the field. However, the drive assembly 30 can experience a deterioration in performance under certain conditions and/or over time, which may result in the material 26 being applied at a rate other than the target application rate and/or the drive assembly 30 operating with undesirable characteristics (e.g., high temperature, high current, high voltage, high torque), for example. Accordingly, certain embodiments include the monitoring system 22 to monitor components of the metering system 18 (e.g., the drive units of the drive assembly 30).

Figure 3:
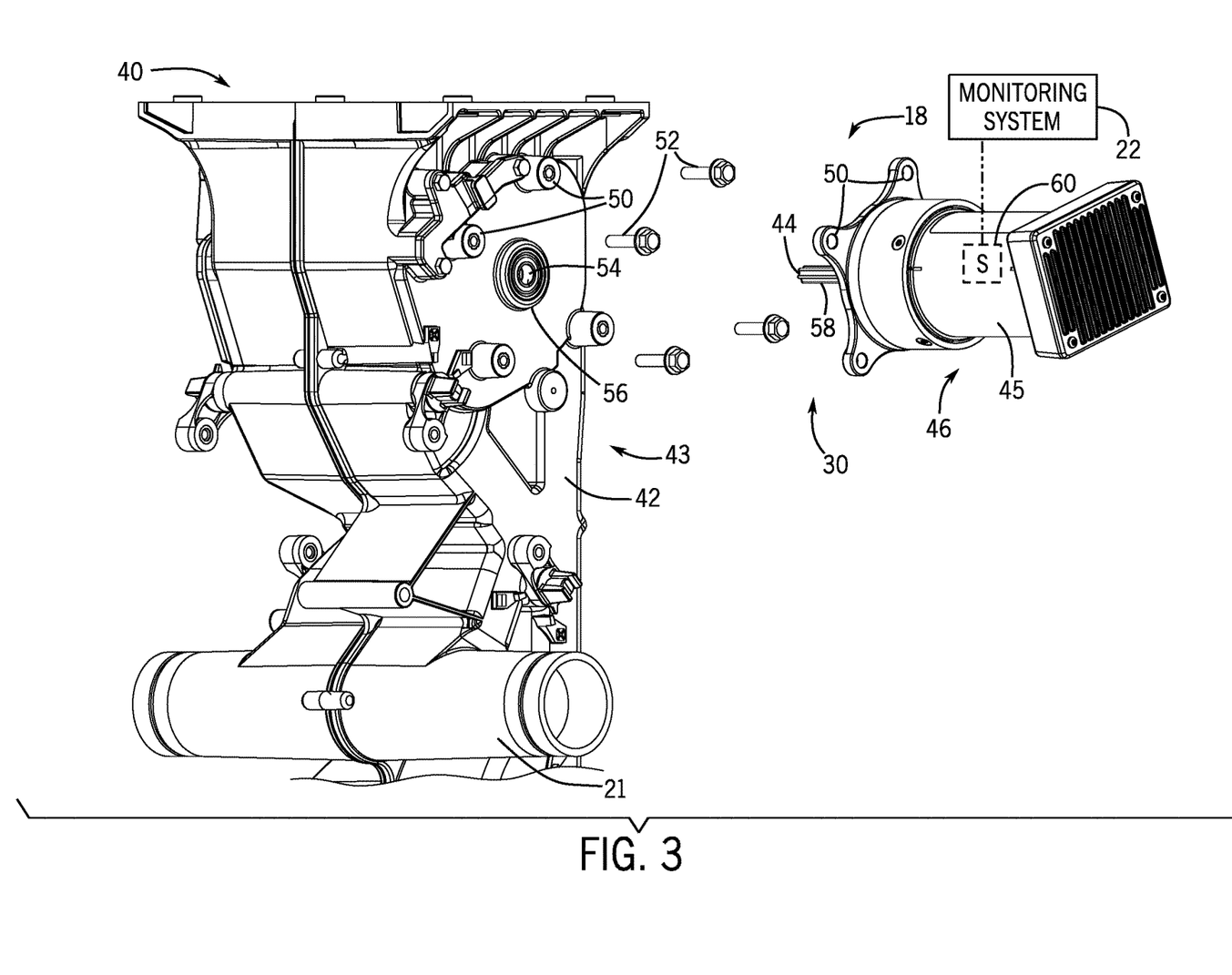
FIG. 3 is an exploded perspective view of an embodiment of a portion of the metering system of the air cart of FIG. 1.

FIG. 3 is an exploded perspective view of an embodiment of the metering system 18 that may be employed within the air cart 10 of FIG. 1. The metering system 18 includes a meter box 40 and a drive system 30. The meter box 40 has a passage 42 configured to direct the flowable particulate material 26 (FIG. 2) to the conduit 21 for transfer to a row unit or group of row units. As shown in FIG. 3, the meter box 40 has a first side 43 (e.g., drive side) for receiving a drive unit 46 of the drive system 30. In the illustrated embodiment, the drive unit 46 includes a drive shaft 44 and a motor 45 (e.g., electric motor) that drives the drive shaft to rotate in a clockwise or counter-clockwise direction. The drive unit 46 and the meter box 40 include apertures 50 configured to receive fasteners 52 (e.g., bolts) to secure the drive unit 46 to the meter box 40. However, it should be appreciated that the drive unit 46 may be secured to the meter box 40 via other mechanisms, such as quarter-turn locks. The drive shaft 44 is inserted into an opening 54 in the meter box 40 such that the drive shaft 44 engages the meter roller 28 (FIG. 2) within the meter box 40. The drive shaft 44 is configured to drive the meter roller 28 to rotate. A bearing 56 (e.g., ball bearing) facilitates rotation of the drive shaft 44 and the meter roller 28 within the meter box 40. As the conduit 21 transfers air under the passage 42, the motor 45 of the drive unit 46 drives the drive shaft 44 to rotate the meter roller 28. As the meter roller 28 rotates, the meter roller 28 dispenses flowable particulate material 26 via the passage 42 to the air flow within the conduit 21 to form the air/material mixture 38 (FIG. 2). Further, pressurized air from the storage tank 12 (FIG. 2) may flow through the passage 42 with the material 26 from the meter roller 28.

In the illustrated embodiment, the drive shaft 44 includes a first engagement feature 58, such as protrusions, configured to non-rotatably couple the drive shaft 44 to the meter roller 28. The protrusions may engage corresponding recesses of the meter roller 28, thereby non-rotatably coupling the drive shaft 44 to the meter roller. While the drive unit 46 includes an electric motor in the illustrated embodiment, it should be appreciated that in alternative embodiments, the drive unit 46 may include any other suitable system configured to drive rotation of the meter roller 28, such as a hydraulic motor or a pneumatic motor. The air cart 10 may include multiple drive units 46 and multiple meter boxes 40 arranged laterally across the air cart 10. In certain embodiments, each meter box 40 includes one meter roller 28 that is independently driven by a dedicated drive unit 46.

As discussed in more detail below, the monitoring system 22 may monitor components of the metering system 18 (e.g., the drive units 46 of the drive assembly 30). For example, the monitoring system 22 may receive data (e.g., sensor data, such as temperature, current, voltage, torque) indicative of the performance of each drive unit 46 from one or more sensors 60, and the monitoring system 22 may process the data to determine a condition of each drive unit 46. While the one or more sensors 60 are illustrated schematically to facilitate discussion, it should be appreciated that the one or more sensors 60 may be positioned at any suitable location. For example, in an embodiment, the various electronic components of the drive unit 46 are located within a housing portion at one end of the drive unit 46 opposite the drive shaft 44, and thus, the one or more sensors 60 may be positioned within the housing portion.

Figure 4:
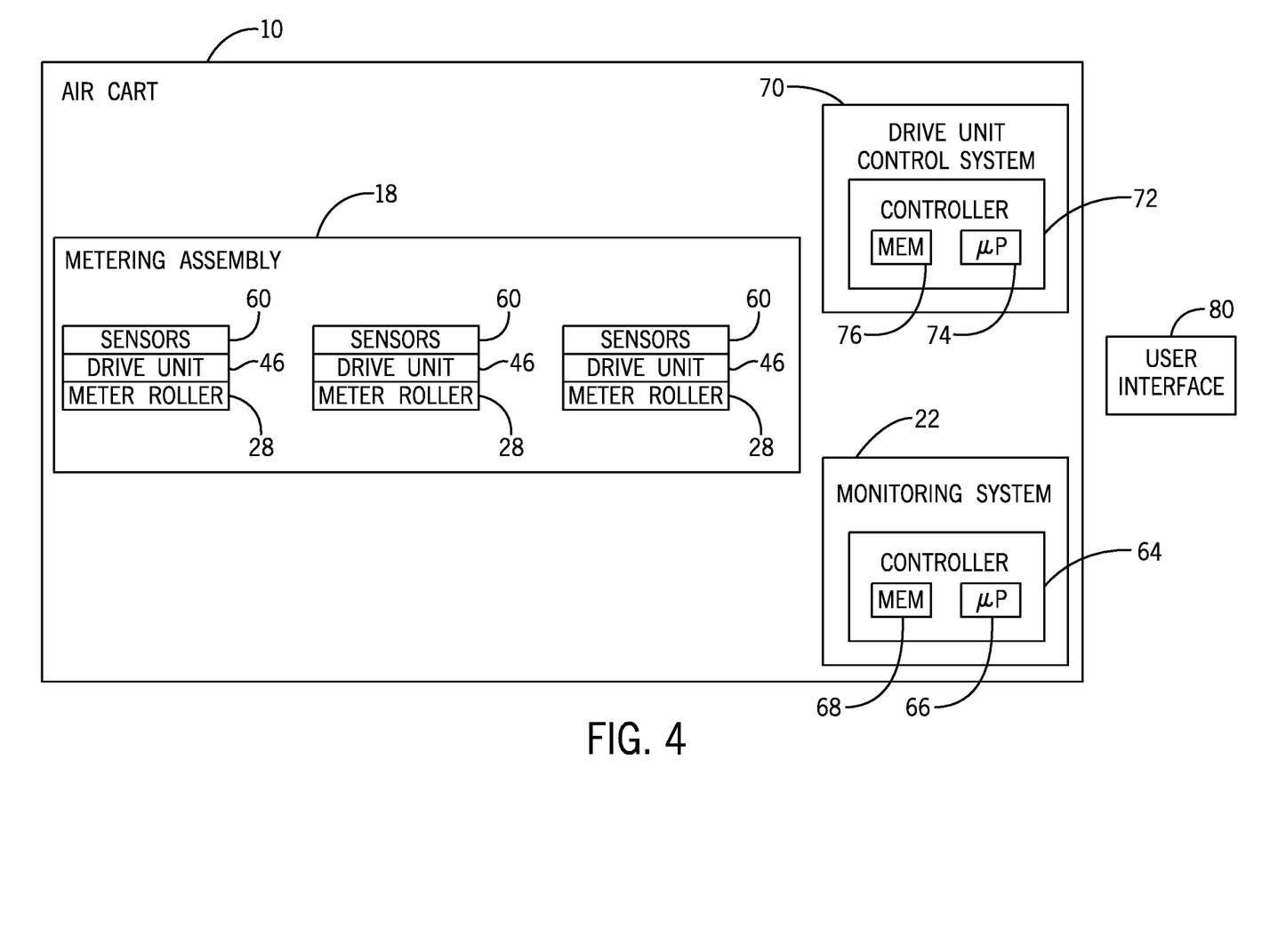
FIG. 4 is a schematic diagram of an embodiment of an agricultural system including the air cart, the metering system, and the monitoring system of FIG. 1.

FIG. 4 is a schematic diagram of an embodiment of a system 62 (e.g., an agricultural system) having the air cart 10, the metering system 18, and the monitoring system 22. As shown, the metering system 18 is supported on the air cart 10 and includes multiple meter rollers 28 and drive units 46. In the illustrated embodiment, each meter roller 28 is driven independently by one drive unit 46, although other configurations are envisioned. Each drive unit 46 includes or is coupled to one or more sensors 60 that obtain data (e.g., sensor data, such as temperature, current, voltage, torque) related to the drive unit 46.

The one or more sensors 60 provide the data to a controller 64 (e.g., an electronic controller), which includes a processor 66 and a memory 68. The processor 66 may process the data to determine a condition of the drive unit 46. For example, data outside of certain ranges and/or certain combinations of data may indicate that the drive unit 46 is impaired (e.g., not functioning properly, such as not functioning in an appropriate or expected manner). The processor 66 may also be configured to estimate remaining life of the drive unit 46 and/or to predict maintenance needs for the drive unit 46 based on the data, for example. Thus, the monitoring system 22 may enable the operator to schedule inspection and repair of the metering system 18 prior to the drive unit 46 failing completely, thereby extending the life of components of the metering system 18, reducing downtime, and/or reducing operating costs. The monitoring system 22 may also enable the operator to schedule inspection or repair at convenient times, such as during the off-season. Advantageously, the monitoring system 22 may separately monitor the condition of each drive unit 46.

More particularly, the one or more sensors 60 may be configured to obtain data indicative of operating conditions of the drive unit 46. In some embodiments, the drive unit 46 is an electric motor that is controlled (e.g., via a drive unit control system 70) to rotate the drive shaft 44 (FIG. 3) to drive the meter roller 28 at a rotational rate to distribute the material 26 (FIG. 2) at the target application rate. In the illustrated embodiment, the drive unit control system 70 includes a controller 72 (e.g., an electronic controller) having a processor 74 and a memory 76, and the drive unit control system 70 may control operation of the drive units 46 by receiving the target application rate input by the operator, calculating appropriate parameters to achieve the target application rate, and sending control signals to the drive units 46 to operate at to the appropriate parameters. It should be appreciated that the metering system 18 may be calibrated (e.g., prior to operation), and thus, an amount of product dispensed per revolution of the meter roller 28 is known. Accordingly, the calibration data may be used by the controller 72 to determine the appropriate parameters to achieve the target application rate. In some embodiments, operation of the drive unit 46 may be controlled via a closed loop or feedback control, and the drive unit control system 70 may control a voltage and/or an input current to adjust a torque (e.g., in response to an increased load) to rotate the drive shaft 44 to drive the meter roller 28 at a rotational rate that causes distribution of the material 26 at the target application rate as the air cart 10 travels through the field.

When the drive unit 46 is an electric motor, the one or more sensors 60 may include a temperature sensor configured to measure a temperature of the drive unit 46 (e.g., the windings of the drive unit 46), a current sensor configured to measure an input current provided to the drive unit 46, a voltage sensor configured to measure a voltage across the windings of the drive unit 46, and/or a torque sensor configured to measure a torque produced by the drive unit 46. Data obtained by the one or more sensors 60 may be processed by the monitoring system 22 to determine that that the drive unit 46 is impaired, such as due to bearings seizing, debris in the drive units, or the like.

In some embodiments, to effectively monitor the condition of the metering system 18, the monitoring system 22 may gather and analyze baseline data (e.g., baseline sensor data). The baseline data may include data that is indicative of properly functioning drive units 46 (e.g., healthy data) and/or data that is indicative of changes that occur as the drive units 46 approach failure (e.g., impaired data). The baseline data may be used to establish one or more thresholds (e.g., temperature, current, voltage, and/or torque thresholds). The one or more thresholds may include an upper threshold, a lower threshold, or a range defined by upper and lower thresholds. For example, the baseline data may be used to establish that the current should remain below a threshold current when the drive unit 46 is functioning properly based on the baseline data. Thus, if the current detected by the one or more sensors 60 exceeds the threshold current, the monitoring system 22 will determine that the drive unit 46 is impaired.

The baseline data may include empirical data, historical data, modeled data, or any combination thereof. The baseline data may include data obtained from the one or more sensors 60 of the air cart 10, and the one or more thresholds may be unique to each drive unit 46 and/or to each air cart 10. Additionally or alternatively, the baseline data may include data obtained from one or more sensors 60 of multiple other air carts 10, and the one or more thresholds may be utilized for the air cart 10 and the multiple other air carts 10. It should be appreciated that the one or more thresholds may be updated and/or modified over time. For example, the one or more thresholds may be generated at manufacturing based on baseline data obtained from one or more sensors 60 of multiple air carts 10. Then, after one particular air cart 10 is delivered and ready for use in the field, the one or more thresholds may be updated based on additional baseline data obtained via the one or more sensors 60 during a calibration or baseline testing protocol that may be completed (e.g., in response to an operator input) prior to driving through the field to complete planting operations. In some embodiments, the baseline data may be collected and/or the one or more thresholds may be updated periodically, such as at the beginning of a season (e.g., planting season) or at some other interval (e.g., daily, weekly, monthly, yearly). For example, a seasonal check at the beginning of each season (e.g., without the material 26 in the storage tank 12) may be performed to establish respective baselines (e.g., season 1 baseline, season 2 baseline, and so forth). In some embodiments, the air cart 10 may provide the option (e.g., via a user interface 80) to run a system test to initiate operation of the metering system 18 to establish the respective baseline for the current season. The system test may be run every year, and the respective baseline for the current season may be compared to the respective baselines for prior seasons to determine whether the metering system 22 is functioning properly, for example. In this way, the operator may be alerted as to deterioration that may have occurred in the off-season (e.g., due to corrosion in bearings, debris in the drive units 46) and/or prior to loading the material 26 into the storage tank 12. The one or more thresholds may be stored in any suitable memory or storage device, such as the memory 68.

To monitor the metering system 18, the one or more sensors 60 may monitor one or more operational characteristics of each drive unit 46 as the air cart 10. The one or more sensors 60 may monitor the metering system 18 as the air cart 10 travels through the field, or at other times, such as in response to an operator input to initiate a monitoring protocol prior to driving through the field. During monitoring, the data may be provided from the one or more sensors 60 to the processor 66, and the data may be analyzed (e.g., via comparison to the one or more thresholds) to determine whether the drive unit 46 is impaired. For example, the operator may request that the material 26 be delivered at the target application rate, and the drive unit 46 may be controlled by the drive unit control system 70 to rotate the drive shaft 44 to drive the meter roller 28 to deliver the material 26 at the target application rate. However, if the load is greater than the load during the baseline measurements (e.g., due to bearings seizing, debris in the drive unit), the drive unit control system 70 will increase the input current to increase the torque to attempt to deliver the material 26 at the target application rate. Thus, the input current provided to achieve the target application rate may be greater than the input current (e.g., baseline input current) provided to achieve the target application rate at an earlier time, and this increase in the input current to achieve the same target application rate may indicate that the drive unit 46 is impaired.

An increase in voltage and/or temperature may also indicate a high torque condition or an impending stall in the drive unit 46. It should be appreciated that ambient temperature may be taken into account by the processor 66 when analyzing changes in the temperature of the drive unit 46. Accordingly, data indicative of the input current and/or other operational characteristics, such as the voltage and/or temperature, may be compared to the one or more thresholds to determine whether the drive unit 46 is impaired. In some embodiments, to facilitate efficient review by the operator, the processor 66 may determine a health index (e.g., a numerical value, such as on a scale of 1 to 10 or 1 to 100) indicative of a degree of impairment of the metering system 18. For example, if the input current exceeds the threshold by a first value (e.g., amount or percentage), the health index may be a first number. However, if the input current exceeds the threshold by a second value greater than the first value, the health index may be a second number different than the first number. Additionally, it should be appreciated that the monitoring system 22 may also estimate remaining life of the drive unit 46 and/or predict maintenance needs of the drive unit 46 (e.g., recommended maintenance date and time) based on the comparison between the one or more operational characteristics and the one or more thresholds. For example, based on the baseline data, the monitoring system 22 may correlate a particular input current to a particular number of hours of operational life remaining. It should also be appreciated that the one or more thresholds may include at least one threshold that is appropriate for a first target application rate for a first type of material, and at least one other threshold that is appropriate for a second target application rate for the first type of material.

In some embodiments, the monitoring system 22 may monitor the operational characteristics over time (e.g., continuously or periodically at the beginning of every planting season and/or every hour, day, week, year). The processor 66 may be configured to calculate and analyze a trend in the operational characteristics over time and/or a rate of change of the operational characteristics over time to determine whether the drive unit 46 is impaired. For example, a gradual increase in the input current over time to achieve the target application rate may indicate that the drive unit 46 is impaired. Furthermore, as noted above, the baseline data may include data that is indicative of changes that occur as the drive units 46 approach failure (e.g., impaired data), and so trends and/or rates of change can be compared to baseline trends and/or rates of changes to determine whether the drive unit 46 is impaired. In this manner, the monitoring system 22 may also determine a health index, estimate remaining life of the drive unit 46, and/or predict maintenance needs of the drive unit 46. For example, based on the baseline data, the monitoring system 22 may correlate a particular rate of increase of the input current over time to a particular number of hours of operational life remaining.

The one or more thresholds may be categorized (e.g., in a database in the memory 68) according to various other parameters unrelated to the drive units 46, such as parameters related to the material 26 (e.g., product type, particle size, particle weight) and/or environmental parameters (e.g., humidity). For example, one threshold may be appropriate for a first target application rate for a first type of material at a first humidity level, while another threshold may be appropriate for a first target application for a second type of material at the first humidity level. Similarly, one threshold may be appropriate for the first target application rate for the first type of material at the first humidity level, while another threshold may be appropriate for the first target application for the first type of material at a second humidity level.

Accordingly, in some embodiments, the one or more thresholds are generated using baseline data collected under various conditions (e.g., different material 26 and/or environmental parameters). In operation, the other parameters may be provided as inputs to the processor 66, and the processor 66 may select the appropriate threshold(s) based on the other parameters. For example, prior to operating the air cart 10, the operator may input the other parameters, and the processor 66 may select the appropriate threshold(s) based on the parameters input by the operator. Additionally or alternatively, one or more additional sensors (e.g., a humidity sensor) and/or a positioning system (e.g., global positioning system or other satellite system) associated with the air cart 10 or the tow vehicle may be utilized to gather these parameters (e.g., weather conditions at the location of the air cart 10). In some embodiments, one or more additional thresholds related to other parameters for the drive units 46 may be stored and used to evaluate the condition of the metering system 18. For example, a number of times the drive units 46 have been powered off and on since installation may be counted and compared to one or more thresholds (e.g., stored in the memory 68), and the monitoring system 22 may determine the condition of the metering system 18 based on this comparison as the cycles may affect brushes in the drive units 46.

It should be appreciated that the baseline data may be utilized to generate one or more algorithms and/or to build (e.g., train and test) one or more models (e.g., predictive models). For example, the baseline data may be input into a machine learning algorithm to build the one or more models, and the one or more models may then be stored (e.g., in the memory 68). Subsequently, data collected by the one or more sensors 60 may be received at the processor 66 and input into the one or more models, which provide an output that indicates whether the drive unit 46 is impaired, a health index, an estimate of remaining life, and/or a prediction of maintenance needs.

In some embodiments, to effectively monitor the condition of the metering system 18, the monitoring system 22 may additionally or alternatively compare the sensor data obtained for each drive unit 46. For example, the monitoring system 22 may compare sensor data obtained for a first drive unit 46 at a first time or over a first time period, sensor data obtained for a second drive unit 46 at the first time or over the first time period, sensor data obtained for a third drive unit 46 at the first time or over the first time period, and so forth, to one another. In this way, sensor data from the other drive units 46 of the air cart 10 may act as baseline data and/or may effectively be used establish the one or more thresholds. For example, the sensor data collected from all of the drive units 46 at the first time or over the first time period may indicate that under the present operating conditions (e.g., a type of material being dispensed and/or environmental conditions), the current should remain below a threshold current when the drive unit 46 is functioning properly. In such cases, the threshold current may be determined based on an average, a median, or some other analysis (e.g., cluster analysis) of the current measured at each drive unit 46. However, if the current detected by the one or more sensors 60 for one of the drive units 46 exceeds the threshold current or is otherwise determined to be significantly different (e.g., an outlier) from the current detected by the one or more sensors 60 of the other drive units 46 at the first time or over the first time period, the monitoring system 22 will determine that the drive unit 46 is impaired.

It should be appreciated that the comparison of the sensor data from the different drive units 46 may be updated over time (e.g., carried out continuously or periodically as the air cart 10 travels through the field; the process may be carried out to analyze sensor data obtained at the first time or over the first time period, and then the process may be repeated to analyze sensor data obtained at a second time or over a second time period, and so forth, and the time periods may be rolling time windows). Furthermore, the analysis based on the comparison of the sensor data from the different drive units 46 at the first time or over the first time period may be combined with the analysis based on baseline data obtained at an earlier time period (e.g., at the beginning of the season). For example, the monitoring system 22 may determine that the drive unit 46 is impaired only if the current is significantly different than the current of other drive units 46 at the same time (e.g., the first time or over the first time period) and the current also exceeds the one or more thresholds determined based on the baseline data obtained at the earlier time period. In some embodiments, the monitoring system 22 may determine that the drive unit 46 is impaired if the current is significantly different than the current of other drive units 46 at the same time (e.g., the first time or over the first time period) or if the current also exceeds the one or more thresholds determined based on the baseline data obtained at the earlier time period. Other characteristics, such as the voltage and/or temperature, may be monitored in a similar manner. Furthermore, the comparison of the performance of the drive units 46 to one another may be used to determine the health index, to estimate a remaining life of the drive unit 46, and/or to predict maintenance needs of the drive unit 46. The monitoring system 22 may also analyze trends over time, such as whether the current for the first drive unit 46 increases faster than the current for the second drive unit 46 over a period of time (e.g., the first period of time), to determine whether any of the drive units 46 are impaired.

The system 62 may also include one or more user interfaces 80, which may be located in a cab of the tow vehicle that tows the air cart 10, at a remote base station that does not travel with the air cart 10 (e.g., in another vehicle or computer device located outside of the field), and/or a personal device (e.g., smart phone, computer device) of the operator. In some embodiments, the monitoring system 22 may be configured to provide an output (e.g., audible and/or visual output) via the user interface 80. For example, the user interface 80 may include a display, and the processor 66 of the monitoring system 22 may instruct the user interface 80 to display an indication of impairment of the metering system 18, the health index, the estimated remaining life, and/or predicted maintenance (e.g., a recommended time to complete the maintenance, troubleshooting steps, and/or parts that should be inspected for replacement, such as inspection of bearings or clearing of debris).

Additionally or alternatively, the processor 66 may instruct the user interface 80 to display an image representative of a particular drive unit 46 that needs attention. For example, an image of the metering system 18 of the air cart 10 may be shown on the display, and the drive unit 46 that needs attention may be highlighted in a different color. The user interface 80 may also include other output devices, such as speakers, and/or input devices (e.g., touchscreen, keys, buttons) to enable the user to provide the inputs (e.g., the target application rate; to initiate a calibration or baseline testing protocol; to request display of any impairment, estimated life remaining, and/or predicted maintenance). The user interface 80 may also enable the user to provide inputs to set preferences to control a frequency of notifications related to impairment of the drive units 46. For example, the user may provide an input that results in the user only being notified via the user interface 80 when the drive unit 46 is impaired to a degree at which the health index falls below a certain value, has an estimated remaining life of less than a certain amount (e.g., less than one week), and/or is predicted to require maintenance within a certain time (e.g., within a week).

It should be appreciated that the various components of the monitoring system 22 may be supported on the air cart 10 and/or at any other suitable location, such as on the tow vehicle. It should be appreciated that the monitoring system 22 may be used with operator-controlled, remotely-controlled, and/or autonomous (e.g., self-driving) agricultural systems, such as a system including an autonomous tractor that pulls the air cart 10 through the field.

Figure 5:
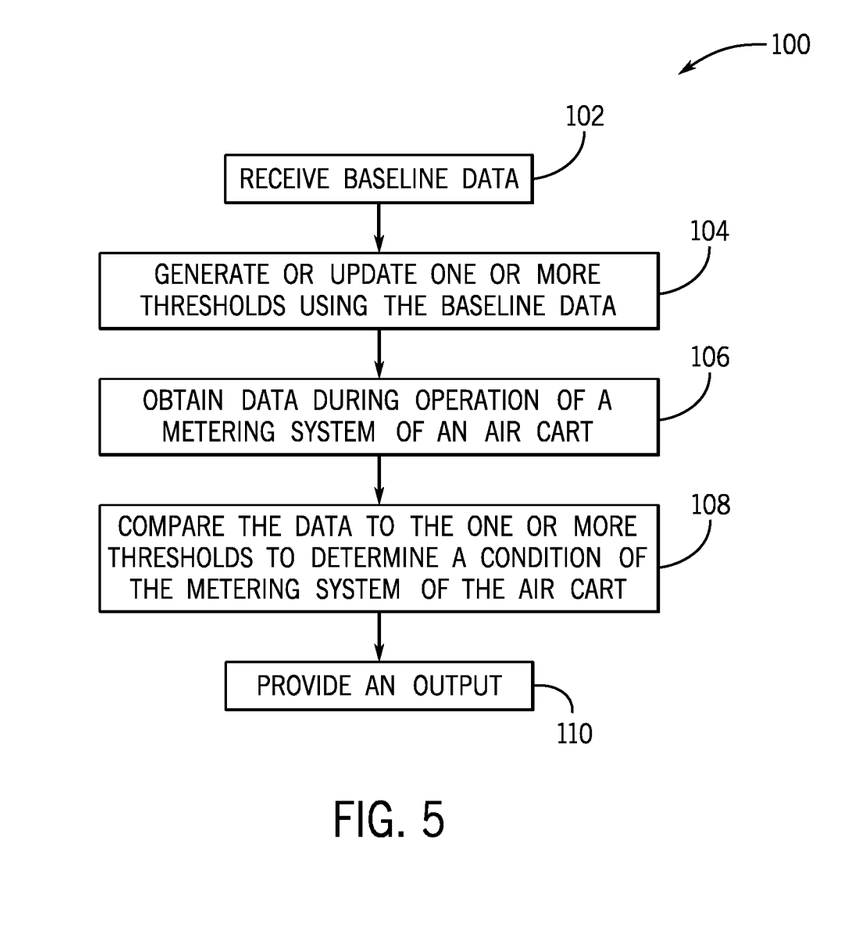
FIG. 5 is a flow diagram of an embodiment of a method of operating the monitoring system to monitor a condition of the metering system of the air cart of FIG. 1.

FIG. 5 is a flow diagram of an embodiment of a method 100 of operating the monitoring system 22 to monitor a condition of the metering system 18 of the air cart 10. The method 100 includes various steps represented by blocks. It should be noted that the method 100 may be performed as an automated procedure by a system, such as the monitoring system 22. Although the flow chart illustrates the steps in a certain sequence, it should be understood that the steps may be performed in any suitable order and certain steps may be carried out simultaneously, where appropriate. Further, certain steps or portions of the method 100 may be omitted and other steps may be added. The steps or portions of the method 100 may be performed by separate devices. For example, a first portion of the method 100 may be performed by the controller 64, while a second portion of the method may be performed by another controller. The portion of the method 100 for generating and updating the one or more thresholds and/or the portion of the method 100 for assessing the components of the metering system 18 may be carried out periodically (e.g., based on instructions stored in a memory device, such as the memory device 68), in response to operator input (e.g., via the user interface 80), or the like.

In step 102, baseline data obtained from the one or more sensors 60 may be provided to the monitoring system 22. As noted above, the baseline data may include empirical data, historical data, modeled data, or any combination thereof. The baseline data may include data obtained from the one or more sensors 60 of the air cart 10, and the one or more models may be unique to each drive unit 46 and/or to each air cart 10. Additionally or alternatively, the baseline data may include data obtained from one or more sensors 60 of multiple other air carts 10, and the one or more models may be utilized for the air cart 10 and the multiple other air carts 10. In some embodiments, the baseline data may be collected at manufacturing and/or periodically, such as at the beginning of a season (e.g., planting season) or at some other interval (e.g., daily, weekly, monthly, yearly). As noted above, the baseline data may also include other parameters unrelated to the drive units 46, such as parameters related to the material 26 (e.g., product type, particle size, particle weight) and/or environmental parameters (e.g., humidity). In some embodiments, the baseline data may include other parameters related to the drive units 46, such as the number of times the drive units 46 have been powered off and on.

In step 104, the baseline data may be used to generate the one or more thresholds, which may then be stored in the memory device 68. It should be appreciated that the one or more thresholds may be updated and/or modified over time as new baseline data is collected.

In step 106, the monitoring system 22 may receive data from one or more sensors 60 of the air cart 10 as the air cart 10 travels through the field or at some other appropriate time. In step 108, the data may be compared to the one or more thresholds to determine whether the drive unit 46 is impaired, generate a health index, estimate remaining life, and/or predict maintenance needs. In some embodiments, the data may be obtained over time (e.g., continuously or periodically at the beginning of every planting season and/or every hour, day, week, year). The processor 66 may be configured to calculate and analyze a trend in the operational characteristics over time and/or a rate of change of the operational characteristics over time to determine whether the drive unit 46 is impaired, to generate a health index, estimate remaining life, and/or predict maintenance needs. As noted above, other parameters unrelated to the drive units 46, such as parameters related to the material 26 (e.g., product type, particle size, particle weight) and/or environmental parameters (e.g., humidity) may be input and utilized by the processor 66, such as to select the appropriate one or more thresholds.

In step 110, the monitoring system 22 provide an output via the user interface 80. For example, the monitoring system 22 may instruct the user interface 80 to provide an output indicative of the whether the metering system 18 is impaired, a health index, the estimated remaining life of components of the drive unit 46, and/or the predicted maintenance needs for components of the drive unit 46. It should be appreciated that the monitoring system 22 may determine the condition and/or provide the output prior to complete failure of the drive unit 46 (e.g., the drive unit 46 is still capable of driving the meter roller 24, and may even be capable of driving the meter roller 24 to provide the material 26 at the target application rate). In this manner, the monitoring system 22 provides advanced or early notice that the drive unit 46 in impaired and that the performance of the drive unit 46 (e.g., the ability of the drive unit 46 to drive the meter roller 28 to hit the target application rate) may soon become affected. Furthermore, the monitoring system 22 may determine the condition and/or provide the output separately for each drive unit 46, thereby directing the operator to inspect and/or repair a particular drive unit 46 of the metering system 18. As noted above, the monitoring system 22 may additionally or alternatively compare sensor data obtained for each drive unit 46 at a particular time or over a particular time window to each another to determine whether the drive unit 46 is impaired, generate a health index, estimate remaining life, and/or predict maintenance needs.

The processors 66, 74 may be used to execute instructions or software. Moreover, the processors 66, 74 may include multiple microprocessors, one or more "general-purpose" microprocessors, one or more special-purpose microprocessors, and/or one or more application specific integrated circuits (ASICS), or some combination thereof. For example, the processors 66, 74 may include one or more reduced instruction set (RISC) processors. The memory devices 68, 76 may include a volatile memory, such as random access memory (RAM), and/or a nonvolatile memory, such as ROM. The memory devices 68, 76 may store a variety of information and may be used for various purposes. For example, the memory devices 68, 76 may store processor-executable instructions (e.g., firmware or software) for the processors 66, 74 to execute, such as instructions for performing test protocols, processing the sensor data, generating the one or more thresholds, calculating the health index, determining the condition of the metering system 18, estimating remaining life, and/or predicting maintenance needs. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., algorithms, models, thresholds, etc.), instructions (e.g., software or firmware for processing the sensor date, etc.), and any other suitable data.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A monitoring system for an agricultural metering system, comprising:
   the agricultural metering system including
      a plurality of meter rollers, each meter roller configured to dispense a particulate material from a storage tank into an air flow within a respective associated conduit, and a plurality of motors, the plurality of motors configured to drive rotation of the corresponding plurality of meter rollers; and
  - wherein a plurality of drive units of the agricultural metering system comprises the plurality of motors, and the monitoring system is configured to separately monitor each motor of the plurality of motors;
- a processor configured to:
  - receive sensor data from a plurality of sensors positioned about the agricultural metering system, wherein a portion of the sensors of the plurality of sensors corresponds to more than one of
    - a current sensor, a voltage sensor, a temperature sensor, a torque sensor, or any combination thereof;
  - compare the sensor data to one or more thresholds to determine a condition of at least one drive unit of the plurality of drive units of the agricultural metering system; and
  - provide an output indicative of the condition of the at least one drive unit of the agricultural metering system.

2. The monitoring system of claim 1, wherein the processor is configured to receive the sensor data, determine the condition of each drive unit of the plurality of drive units, and provide the output prior to complete failure of each drive unit while each drive unit of the plurality of drive units is capable of driving the corresponding plurality of meter rollers of the agricultural metering system to deliver a particulate material at a target application rate set by an operator.

3. The monitoring system of claim 1, wherein the sensor data comprises input current provided to the plurality of drive units of the agricultural metering system.

4. The monitoring system of claim 1, wherein the processor is configured to receive additional data indicative of parameters unrelated to the plurality of drive units from another portion of the plurality of sensors and to select an appropriate threshold of the one or more thresholds based at least in part on the additional data, and the additional data comprises parameters related to the particulate material, environmental conditions including humidity, or any combination thereof.

5. The monitoring system of claim 1, wherein the processor is configured to receive baseline data and to generate the one or more thresholds using the baseline data.

6. The monitoring system of claim 1, wherein the processor is configured to receive the sensor data continuously or periodically, and the processor is configured to determine the condition of each drive unit of the plurality of drive units based at least in part on a trend in the sensor data, a rate of change of the sensor data, or any combination thereof.

7. A method of monitoring an agricultural metering system, comprising:
- providing an agricultural metering system including
  - a plurality of meter rollers, each meter roller configured to dispense a particulate material from a storage tank into an air flow within a respective associated conduit, and a plurality of motors, the plurality of motors configured to drive rotation of the corresponding plurality of meter rollers; and
  - wherein a plurality of drive units of the agricultural metering system comprises the plurality of motors, and a monitoring system is configured to separately monitor each motor of the plurality of motors;
  - receiving, at a processor, sensor data from a plurality of sensors positioned about the plurality of drive units of the agricultural metering system, wherein a portion of the sensors of the plurality of sensors corresponds to more than one of
  - a current sensor, a voltage sensor, a temperature sensor, a torque sensor, or any combination thereof;
- comparing, via the processor, the sensor data to one or more thresholds to determine a condition of at least one drive unit of the plurality of drive units of the agricultural metering system; and
- instructing, via the processor, a user interface to provide an output indicative of the condition of the at least one drive unit of the plurality of drive units of the agricultural metering system.

8. The method of claim 7, wherein the processor receives the sensor data, determines the condition of the at least one drive unit of the plurality of drive units, and instructs the user interface prior to complete failure of the at least one drive unit and while the at least one drive unit is still capable of driving a meter roller of the agricultural metering system to deliver a particulate material at a target application rate.

9. The method of claim 7, wherein the drive unit comprises an electric drive, a hydraulic drive, or a pneumatic drive.

10. The method of claim 7, comprising:
receiving, at the processor, additional sensor data from another portion of the plurality of sensors positioned about the plurality of drive units of the agricultural metering system, wherein the sensor data and the additional sensor data is collected by the other portion of the plurality of sensors, at a first time or over a first time period; and
generating, using the processor, the one or more thresholds using the sensor data and the additional sensor data, wherein the additional sensor data includes data about the particulate material, environmental conditions including humidity, or any combination thereof.

* * * * *